(12) United States Patent
Kim (10) Patent No.: US 7,663,723 B2
(45) Date of Patent: Feb. 16, 2010

(54) IN-PLANE SWITCHING MODE LIQUID CRYSTAL DISPLAY DEVICE AND FABRICATION METHOD THEREOF

(75) Inventor: Dung-Guk Kim, Gyeonggi-Do (KR)

(73) Assignee: LG Display Co., Ltd., Seoul (KR)

( * ) Notice: Subject to any disclaimer, the term of this patent is extended or adjusted under 35 U.S.C. 154(b) by 153 days.

(21) Appl. No.: 11/374,108

(22) Filed: Mar. 14, 2006

(65) Prior Publication Data

US 2006/0203151 A1    Sep. 14, 2006

(30) Foreign Application Priority Data

Mar. 14, 2005    (KR) .......................... 10-2005-21134

(51) Int. Cl.
G02F 1/1343    (2006.01)
G02F 1/1335    (2006.01)

(52) U.S. Cl. ...................................... 349/141; 349/106
(58) Field of Classification Search ................. 349/141, 349/106
See application file for complete search history.

(56) References Cited

U.S. PATENT DOCUMENTS

| 7,190,419 B2 * | 3/2007 | Park .............................. 349/43 |
| 7,289,176 B2 * | 10/2007 | Chung ........................ 349/115 |
| 2002/0024627 A1 * | 2/2002 | Sakamoto et al. ........... 349/141 |
| 2002/0140891 A1 | 10/2002 | Tomioka et al. |
| 2004/0041970 A1 * | 3/2004 | Lee et al. .................... 349/141 |
| 2004/0150768 A1 | 8/2004 | Shimizu et al. |
| 2004/0189917 A1 | 9/2004 | Tanaka et al. |
| 2004/0263751 A1 * | 12/2004 | Kim et al. .................... 349/141 |
| 2004/0263754 A1 * | 12/2004 | Ahn et al. .................... 349/141 |
| 2005/0052604 A1 | 3/2005 | Kim et al. |
| 2005/0078256 A1 * | 4/2005 | Hong .......................... 349/141 |
| 2005/0099567 A1 * | 5/2005 | Shimizu et al. ............. 349/141 |

FOREIGN PATENT DOCUMENTS

| CN | 1567074 A | 1/2005 |
| JP | 2000-111957 A | 4/2000 |
| JP | 2002-258262 A | 9/2002 |
| JP | 2004-163622 A | 6/2004 |
| JP | 2004-198846 A | 7/2004 |
| KR | 2000-0017034 A | 3/2000 |
| KR | 2002-0070756 A | 9/2002 |
| KR | 2003-0011692 A | 2/2003 |
| KR | 10-2004-0013600 A | 2/2004 |

* cited by examiner

*Primary Examiner*—David Nelms
*Assistant Examiner*—David Y Chung
(74) *Attorney, Agent, or Firm*—Birch, Stewart, Kolasch & Birch, LLP

(57) ABSTRACT

A liquid crystal display device includes a first substrate and a second substrate; a gate line and a data line on the first substrate crossing each other to define a pixel region; a switching element in the pixel region; a black matrix formed along the gate line and the data line on the first substrate, the black matrix having a portion that covers an upper side of the gate line and extends into the pixel region; a color filter located at the pixel region; a common electrode and a pixel electrode located on the color filter for generating an electric field within the pixel region; and a liquid crystal layer formed between the first and second substrates.

18 Claims, 6 Drawing Sheets

IN-PLANE SWITCHING MODE LIQUID CRYSTAL DISPLAY DEVICE AND FABRICATION METHOD THEREOF

This Nonprovisional application claims priority under 35 U.S.C. §119(a) on Patent Application No. 10-2005-0021134 filed in Korea on Mar. 14, 2005, the entire contents of which are hereby incorporated by reference.

BACKGROUND OF THE INVENTION

1. Field of the Invention

The present invention relates to an in-plane switching mode liquid crystal display (LCD) device capable of enhancing an aperture ratio and effectively preventing a light leakage phenomenon, and its fabrication method.

2. Description of the Related Art

A twisted nematic mode LCD device, which is commonly used for a high picture quality and low power consumption flat panel display device, has a disadvantage in that its viewing angle is too narrow. This results from a refractive anisotropy of liquid crystal molecules. That is, when a voltage is applied, liquid crystal molecules parallel to a substrate are rotated to be aligned in an almost vertical direction.

Thus, recently, an in-plane switching mode LCD has been actively studied in order to solve the narrow viewing angle problem by aligning the liquid crystal molecules in an almost horizontal direction.

Figure 1:
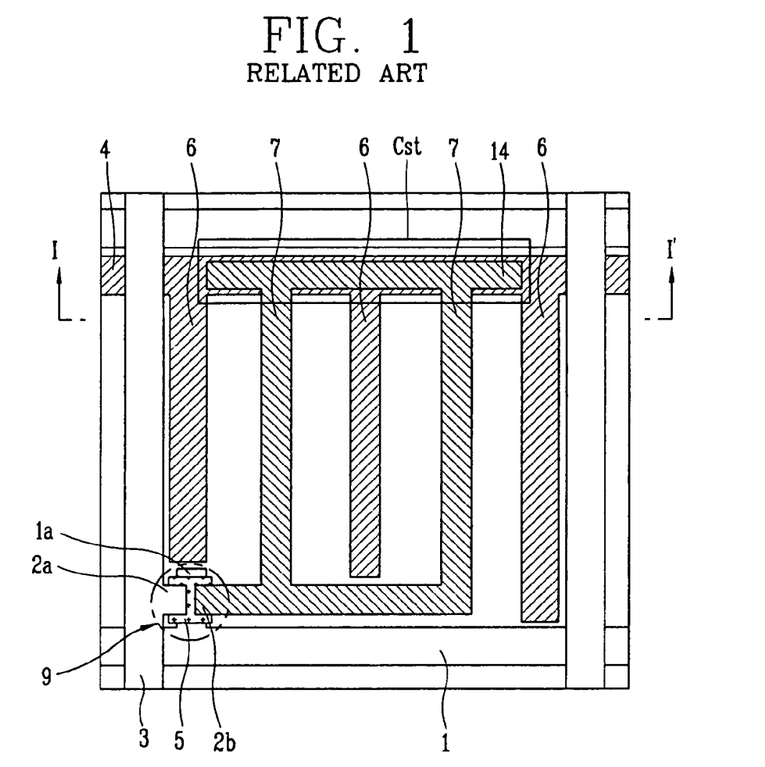
FIG. 1 is a plan view showing a pixel unit of a general in-plane switching mode LCD device.
Figure 2:
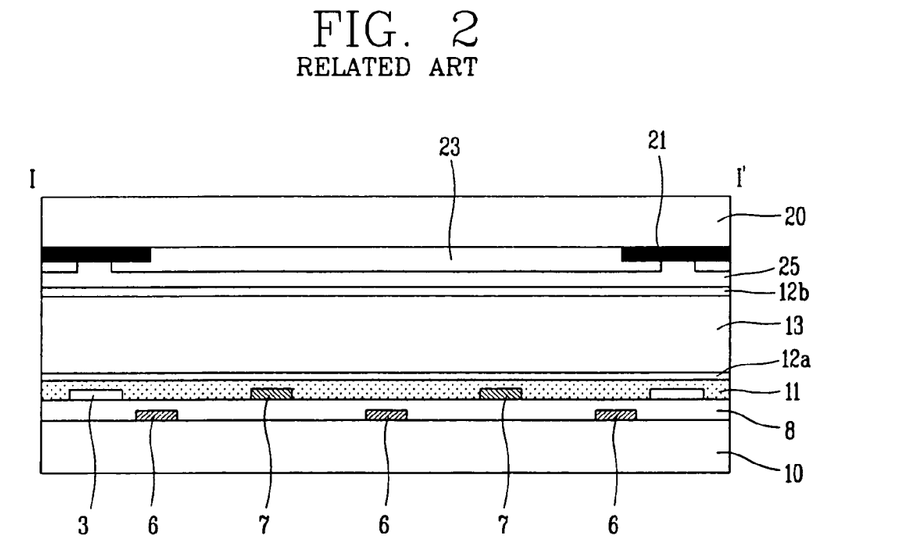
FIG. 2 is a sectional view taken along line I-I' of FIG. 1.

FIGS. 1 and 2 illustrate a pixel unit of a general in-plane switching mode LCD, wherein FIG. 1 is a plan view and FIG. 2 is a sectional view taken along line I-I'.

As shown in FIGS. 1 and 2, a gate line 1 and a data line 3 are respectively arranged horizontally and vertically to define a pixel region on a transparent first substrate 10. In an LCD device, the N number of gate lines and the M number of data lines cross each other to form the N×M number of pixels. In the drawing, only one pixel is shown for the sake of illustration.

In the pixel region, a thin film transistor (TFT) 9 including a gate electrode 1a, a semiconductor layer 5 and source/drain electrodes 2a and 2b is disposed at a crossing of the gate line 1 and the data line 3. The gate electrode 1a and the source/drain electrodes 2a and 2b are connected with the gate line 1 and the data line 3, respectively. In addition, a gate insulation film is stacked entirely over the substrate.

In the pixel region, a common line 4 is arranged to be parallel to the gate line 1, and a pair of electrodes, namely, a common electrode 6 and a pixel electrode 7, for switching the liquid crystal molecules are arranged in parallel. The common electrode 6 is connected with the common line 4 formed together with the gate electrode 1a, and the pixel electrode 7 is connected with the drain electrode 2b of the TFT 9 formed together with the source/drain electrodes 2a and 2b.

A passivation film 11 and a first alignment film 12a are coated entirely over the substrate including the source/drain electrodes 2a and 2b. The common electrode 6 is formed at an outer edge of the pixel region in order to shield a horizontal electric field generated between the pixel electrode 7 formed at the outer edge of the pixel region and the data line 3. A pixel electrode line 14 overlaps with the common line 4 to form a storage capacitor (Cst) with an insulation film 8 interposed therebetween.

In order to prevent a light leakage between pixels, a black matrix 21 is formed at the gate line 1 and the data line 3. A color filter 23 corresponding to each pixel and an overcoat film 25 is formed on the black matrix 21, and a second alignment film 12b is coated on the overcoat film 25. A liquid crystal layer 13 is formed between the first and second substrates 10 and 20.

In the in-plane switching mode LCD with such a structure, when a voltage is not applied, liquid crystal molecules in the liquid crystal layer 13 are aligned along an alignment direction of the first and second alignment films 12a and 12b. When a voltage is applied between the common electrode 6 and the pixel electrode 7, the liquid crystal molecules are aligned in a direction vertical to an extending direction of the common electrode 6 and the data line 3. As mentioned above, since the liquid crystal molecules are switched on the same plane in the liquid crystal layer 13, gray levels are not inverted in viewing angle directions of the up/down direction and the left/right direction.

In the related art in-plane switching mode LCD device, constructed as described above, since the common electrode 6 and the pixel electrode 7 made of an opaque metal are formed in the pixel region, the aperture ratio is reduced.

In addition, in the related art in-plane switching mode LCD device, the first and second substrates must be constructed such that the black matrix 21 can be arranged at positions corresponding to the TFT 9, the gate line 1 and the data line 3 of the first substrate. However, when the two substrates are attached, they may be misaligned to generate light leakage. Thus, in consideration of the alignment margin, the area for forming the black matrix needs to be wider than the areas corresponding to the TFT 9, the gate line 1 and the data line 3. In this case, however, the increase in the area for formation of the black matrix aimed for preventing the light leakage due to the misalignment also reduces the aperture ratio.

SUMMARY OF THE INVENTION

Therefore, one object of the present invention is to provide an in-plane switching mode liquid crystal display device capable of preventing the reduction of an aperture ratio due to misalignment between the first and second substrates.

Another object of the present invention is to provide an in-plane switching mode liquid crystal display device capable of preventing the light leakage and improving picture quality by forming a black matrix such that a portion of the black matrix extends to cover the light leakage region of a pixel region.

To achieve these and other advantages and in accordance with the purpose of the present invention, as embodied and broadly described herein, there is provided a liquid crystal display device comprising: a first substrate and a second substrate; a gate line and a data line on the first substrate crossing each other to define a pixel region; a switching element in the pixel region; a black matrix formed along the gate line and the data line on the first substrate, the black matrix having a portion that covers an upper side of the gate line and extends into the pixel region; a color filter located at the pixel region; a common electrode and a pixel electrode located on the color filter for generating an electric field within the pixel region; and a liquid crystal layer formed between the first and second substrates.

To achieve the above objects, there is also provided a method for fabricating a liquid crystal display device comprising: provide a first substrate and a second substrate; forming a gate line and a data line crossing each other on the first substrate to define a pixel region; forming a black matrix along the gate line and the data line on the first substrate, the black matrix having a portion that covers an upper side of the gate line and extends into the pixel region; forming a color filter at the pixel region; and forming a pixel electrode and a common electrode on the first substrate for generating an electric field in the pixel region.

As mentioned above, in the present invention, by forming the common electrode and the pixel electrode as transparent electrodes and forming the color filter and the black matrix together on a lower substrate, namely, on a TFT array substrate, an aperture ratio can be more improved. In case of forming the black matrix on the lower substrate, the black matrix can be formed without having to consider the alignment margin during a process of attaching the two substrates (upper and lower substrates). That is, compared with the related art in which the black matrix formation area is increased to prevent misalignment, in the present invention, since the black matrix is formed only at a necessary region on the lower substrate, the area for forming the black matrix can be reduced and thus the aperture ratio can be improved.

In addition, in the present invention, since the portion of the black matrix is formed to extend into the pixel region, the light leakage generated between the gate lines and the pixel electrodes can be effectively prevented. In general, a voltage of about −5V is applied to the gate lines in an OFF state. Therefore, an electric field is formed between the pixel electrodes and the gate lines due to the OFF voltage applied to the gate lines. Accordingly, liquid crystal molecules distributed at the corresponding region are driven by the electric field generated between the gate lines and the pixel electrodes, generating the light leakage. In the present invention, however, since the black matrix is formed between the gate line and the pixel electrode, the light leakage generated at the corresponding region can be effectively prevented.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

The in-plane switching mode LCD device and its fabrication method in accordance with the present invention will be described with reference to the accompanying drawings.

Figure 3:
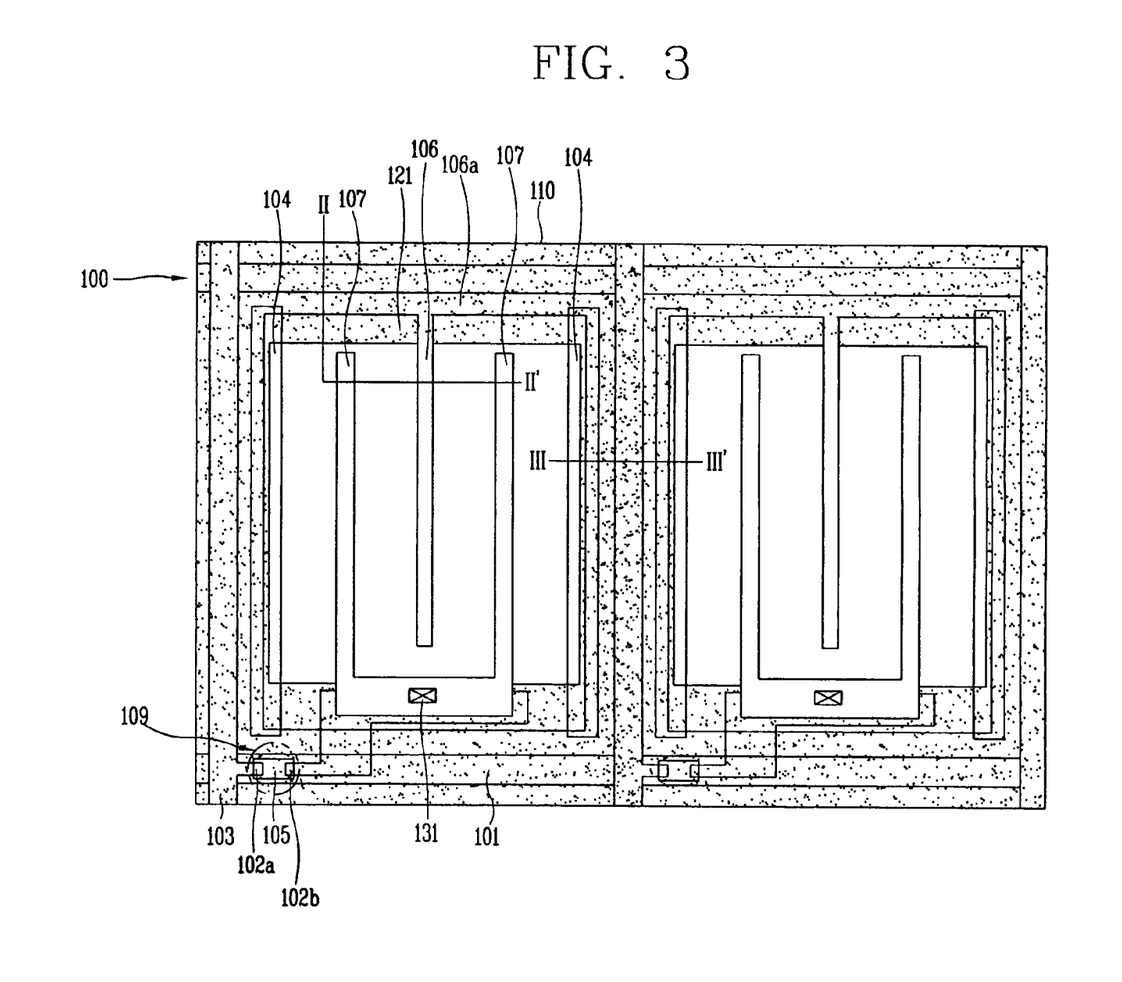
FIG. 3 is a plan view showing an in-plane switching mode LCD device in accordance with an embodiment of the present invention.

FIG. 3 is a plan view showing two adjacent pixel units of an in-plane switching mode LCD device in accordance with an embodiment of the present invention.

As shown in FIG. 3, the in-plane switching mode LCD device is constructed such that gate lines 101 are disposed in a first direction on a transparent substrate 110, and data lines 103 are disposed to vertically cross the gate lines 101 to define pixel regions.

A switching element 109 for switching each pixel is disposed at a crossing of the gate line 101 and the data line 103. The switching element 109 includes a gate electrode formed as a portion of the gate line 101, a semiconductor layer 105 formed on the gate electrode and source/drain electrodes 102a and 102b formed on the semiconductor layer 105.

A common electrode 106 and a pixel electrode 107 for generating in-plane field are formed at the pixel region, and the pixel electrode 107 is electrically connected with the drain electrode 102b through a drain contact hole 131. The common electrode 160 is formed also at an upper portion of the gate line 101 and the data line 103. The common electrode 106 and the pixel electrode 107 are made of a transparent conductive material such as ITO (Indium Tin Oxide) or IZO (Indium Zinc Oxide), and can be formed in a zigzag form.

A data signal cutoff line 104 is formed at an outer edge of the pixel region adjacent to the data line 103, to prevent defective liquid crystal driving caused as a signal between the common electrode 106 and the pixel electrode 107 is distorted by a data signal.

Although not shown in FIG. 3, a color filter is formed at the pixel region. And a black matrix 121 is formed at a region corresponding to the gate line 101 and the data line 103.

Since the color filter and the black matrix are formed together on the TFT array substrate (lower substrate), the black matrix formation area can be reduced compared with the related art. Namely, in the related art, since the color filter and the black matrix are formed on the upper substrate, the upper substrate on which the black matrix is formed and the lower substrate on which the gate lines and the data lines are formed should be aligned precisely. In consideration of misalignment, the black matrix formation region is formed larger than actually required because of the alignment margin. However, in the illustrated embodiment, since the black matrix, the gate line and the data line are formed on the same substrate, the black matrix can be formed at a required region, and thus, the aperture ratio can be enhanced.

In addition, the light leakage can be generated between the gate line 101 and the pixel electrode 107 adjacent to the gate line 101. In the illustrated embodiment, in order to solve the problem, the black matrix 121 is formed to extend into the isolation region between the gate line 101 and the pixel electrode 107.

That is, even when the gate lines 101 are not driven, the OFF voltage of about −5V is applied. Therefore, a voltage difference is generated between the gate line 101 and the pixel electrode 107 adjacent to the gate line 101 due to the OFF voltage of the gate line 101, forming an electric field. The electric field formed between the gate line 101 and the pixel electrode 107 drives liquid crystal molecules at the corresponding region in a black mode to cause the light leakage. Thus, in the illustrated embodiment, by extending the black matrix 121 to cover the upper portion of the gate line 101 into the region adjacent to the pixel electrode 107, it can prevent the light leakage due to the OFF voltage of the gate line.

The common line 106a formed at the upper portion of the gate line 101 covers all the gate lines 101, and a distance between the pixel electrode 107 and the common line 106a extending into the pixel is about 7 μm~9 μm. In this case, the black matrix 121 extending into the pixel region is formed between the common electrode 106a and the pixel electrode 107 and does not overlap with the pixel electrode 107. In addition, the common electrode 106 extends from the portion of the common line 106a covering the upper side of the gate line.

In a method for preventing the light leakage by blocking an influence of the OFF voltage of the gate line, the common electrode 106a overlapping with the gate line 101 can be widened or the distance between the gate line 101 and the pixel electrode 107 can be increased. However, this will degrade the aperture ratio. Therefore, the illustrated embodiment extends the black matrix, rather than increasing the distance between the gate line 101 and the pixel electrode 107, to prevent reduction of the aperture ratio.

A portion 121 of the black matrix formed at the upper portion of the data line 103 to effectively prevent the light leakage between the data line 103 and the data signal cutoff line 104 is formed to overlap with the data signal cut off line 104.

In addition, the black matrix 121 is interposed between the data line 103 and the common electrode 106, which will now be described in detail with reference to FIGS. 4 and 5.

Figure 4:
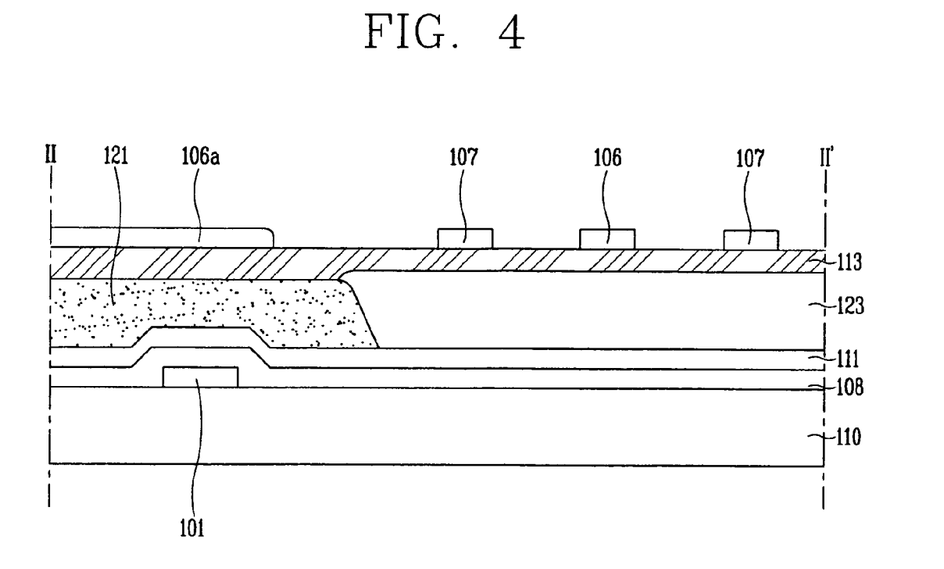
FIG. 4 is a sectional view taken along line II-II" of FIG. 3.
Figure 5:
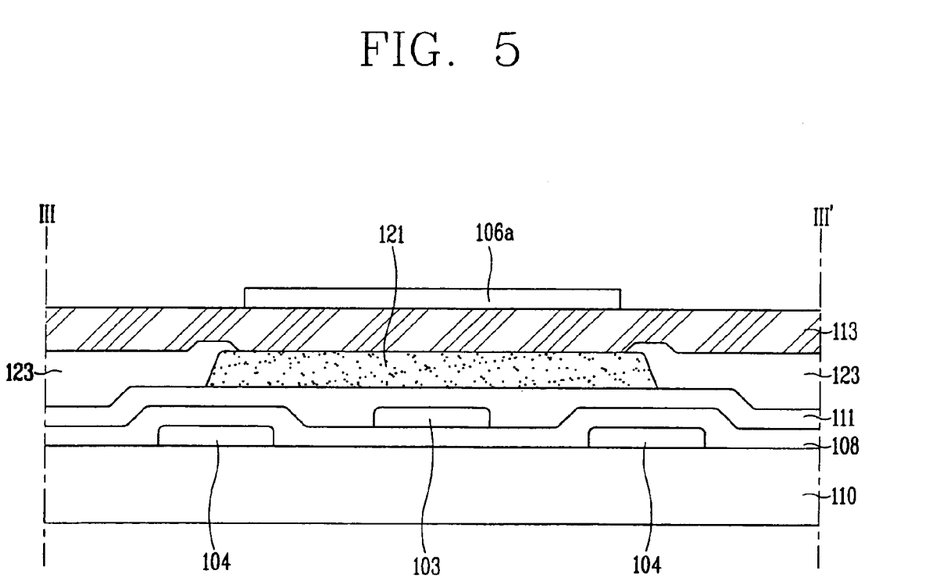
FIG. 5 is a sectional view taken along line III-III' of FIG. 3.

FIG. 4 is a sectional view taken along line II-II" of FIG. 3 and FIG. 5 is a sectional view taken along line III-III' of FIG. 3.

As shown in FIGS. 4 and 5, the gate line 101 and the data signal cutoff line 104 are formed on the transparent first substrate 110, on which a gate insulation film 108 is formed. The data line 103 is formed on the gate insulation film 108, and a passivation film 111 is formed on the entire surface of the substrate including the data line 103.

The black matrix 121 and the color filter 123 are formed on the passivation film 111, on which a planarization film 113 is formed for planarization. The common electrode 106 and the pixel electrode are formed on the planarization film 113. The common line 106a is formed above the upper side of the gate line 101 and above the upper side the data line 103.

A second substrate (not shown) is provided to face the first substrate, and a liquid crystal layer is formed between the first and second substrates. An alignment film (not shown) for determining an initial alignment direction of liquid crystals is coated on each facing surface, and the liquid crystal layer controls transmittance of light according to a voltage applied to the common electrode 106 and the pixel electrode 107.

In this manner, the common electrode 106 and the pixel electrode 107 are formed on the same plane (namely, the planarization film). Formation of the two electrodes 106 and 107 on the same plane will generate a perfect in-plane field with respect to the surface of the substrate when a voltage is applied between the two electrodes. Accordingly, a viewing angle can be enhanced. In addition, compared with the related art, since the electric field between the two electrodes does not pass through the passivation film but is directly applied to the liquid crystal, a stronger electric field can be generated. Because liquid crystal molecules in the liquid crystal layer can be switched faster by the strong electric field, the liquid crystal display will have better performance.

Figure 6A:
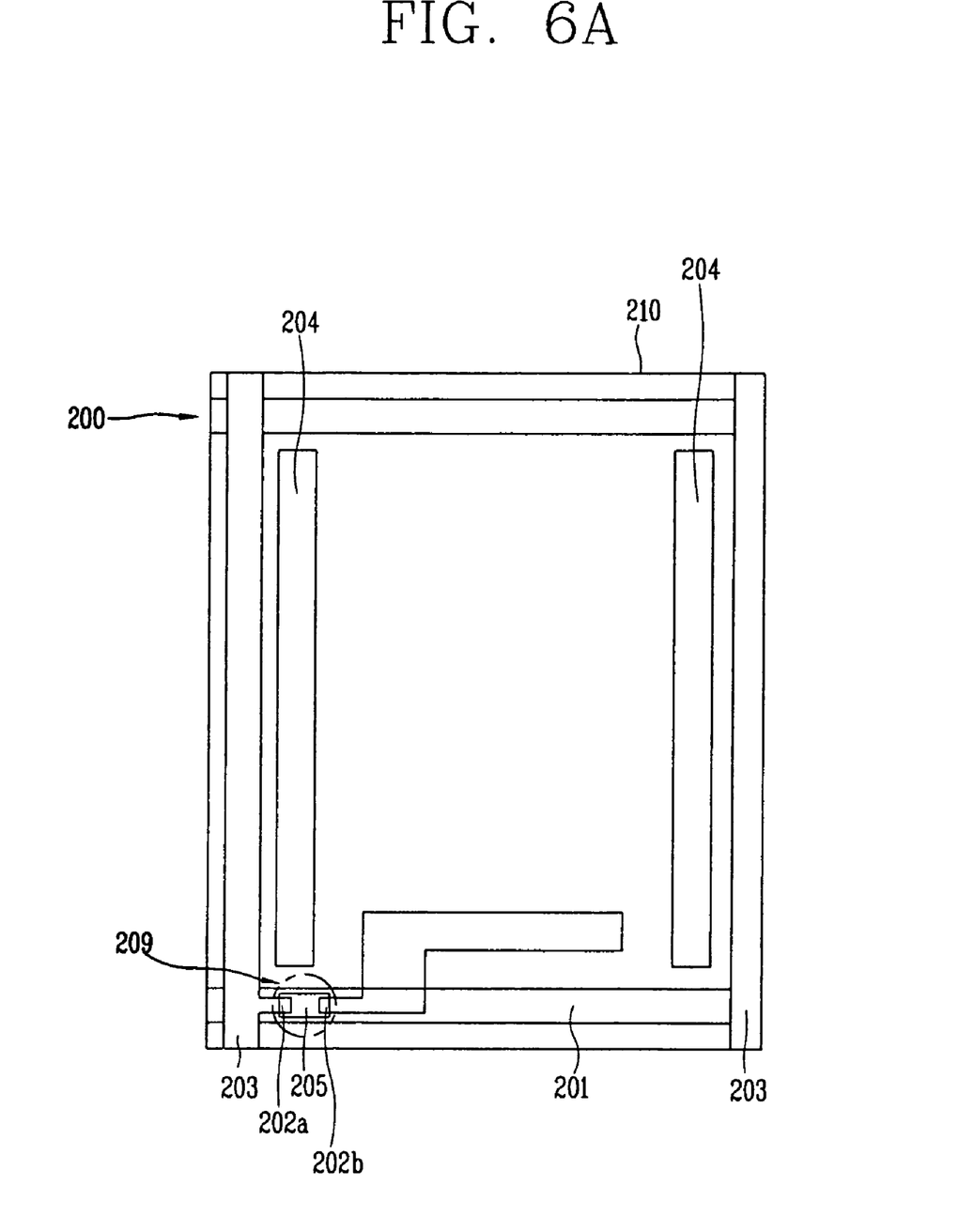
FIGS. 6A to 6C are plan views of forming of the in-plane switching mode LCD device in accordance with an embodiment of the present invention.
Figure 6B:
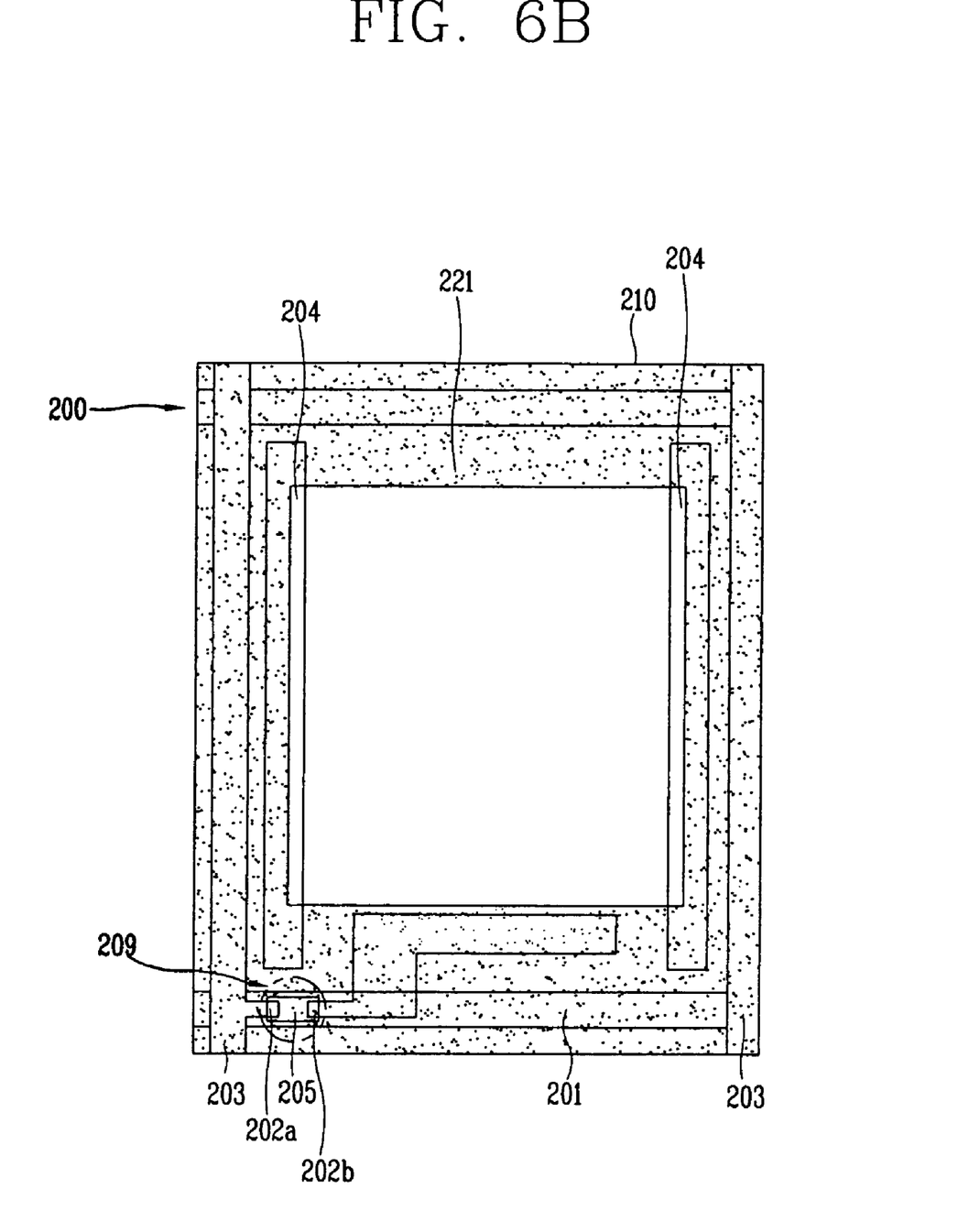
Figure 6C:
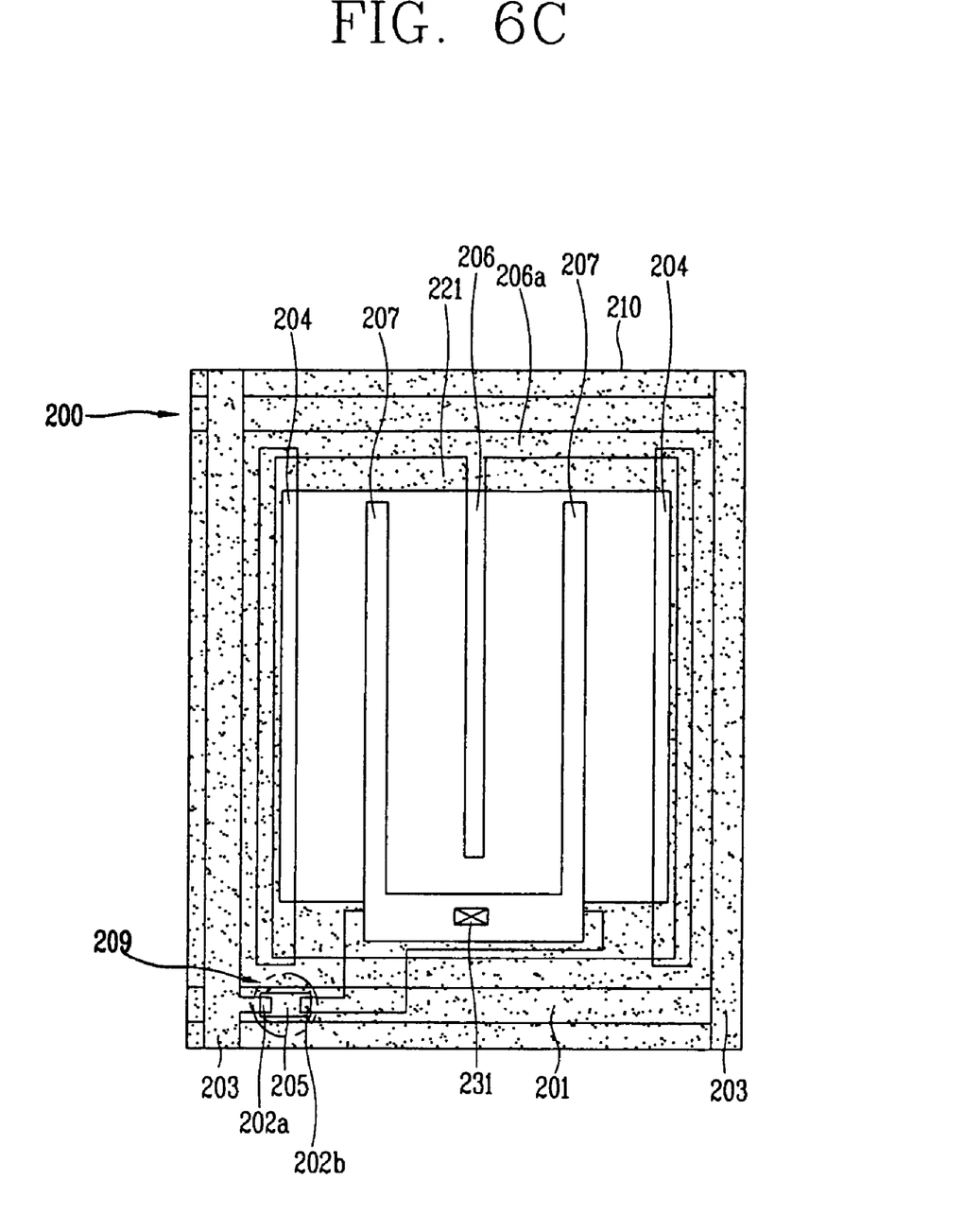

FIGS. 6A to 6C are plan views of the process for forming the in-plane switching mode LCD device in accordance with the present invention.

With reference to FIG. 6A, a transparent first substrate 210 is prepared, on which a gate line 201 and a data signal cutoff line 204 are formed, and a gate insulation film (not shown) is formed thereon. Subsequently, a semiconductor layer 205 is formed on the gate line 201. Then, the data line 203 vertically crossing the gate line 201 to define the pixel region is formed on the upper portion of the gate insulation film (not shown) and source and drain electrodes 202a and 202b are formed spaced apart from each other on the semiconductor layer 205 to complete the switching element 209. A gate electrode can be additionally formed by extending it from the gate line 201, and a channel structure can have a shape of a straight line or a 'U' shape.

Thereafter, the passivation film is formed at an upper portion of the data line 203 and the switching element 209. And then, as shown in FIG. 6B, the color filter (not shown) is formed at the region corresponding to the pixel region, and the black matrix 221 is formed at an upper portion of the passivation film corresponding to the gate line 201 and the data line 203. At this time, the black matrix 221 is formed extending into the pixel region.

Subsequently, the planarization film (not shown) is formed for planarizing the color filter and the black matrix 221. Subsequently, as shown in FIG. 6C, the common line 206a are formed on the planarization film. In addition, the common electrode 206 and the pixel electrode 207 for generating in-plane field in the pixel region are also formed on the planarization film. In this case, the common electrode 206 and the pixel electrode 207 are made of the transparent conductive material such as ITO or IZO. In order to implement a multi-domain, the common electrode 206 and the pixel electrode 207 can be formed in a zigzag form, and the data line 203 can be formed also in the same zigzag form as the common electrode 206 and the pixel electrode 207.

The common line 206a is formed to entirely cover the upper portions of the gate line 201 and the data line 203, and the portion of the common line 206a formed on the gate line 201 extends into the pixel region, which is narrower than the region formed by extending the black matrix 221 to the pixel region. In particular, since the common electrode 206 and the pixel electrode 207 are formed on the same plane, a distance as long as to prevent short-circuiting must be secured therebetween. Thus, in the illustrated embodiment, the distance between the common line 206a and the pixel electrode 207 is about 7 µm~9 µm, and an end of the black matrix 221 extending into the pixel region is positioned between the common line 206a and the pixel electrode 207.

The illustrated embodiment provides the in-plane switching mode LCD device in which the black matrix and the color filter are formed on the TFT array substrate, and its fabrication method. In particular, since the common line is formed on the upper portion of the gate lines and the data lines and the black matrix is positioned between the common line and the pixel electrode and covers the upper portion of the gate lines, misalignment of the upper and lower substrates can be prevented and the aperture ratio can be further enhanced.

In addition, since the black matrix is formed between the gate lines and the pixel electrodes, the light leakage at the regions can be prevented to further improve picture quality.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A liquid crystal display device comprising:
   a first substrate and a second substrate;
   a gate line and a data line on the first substrate crossing each other to define a pixel region;
   a switching element in the pixel region;

a black matrix formed along the gate line and the data line on the first substrate, the black matrix having a portion that covers an upper side of the gate line and extends into the pixel region;

a color filter located at the pixel region;

a planarization film formed on an entire surface of the substrate and covering the black matrix and the color filter;

a common electrode and a pixel electrode above the planarization film for generating an electric field within the pixel region;

a common line having a first portion covering the upper side of the whole area of the gate line and a second portion covering an upper side of the whole area of the data line, the common electrode extending from the first portion of the common line; and a liquid crystal layer formed between the first and second substrates.

2. The device of claim 1, wherein the common electrode and the pixel electrode are made of a transparent conductive material.

3. The device of claim 1, wherein the transparent conductive material is one of ITO (Indium Tin Oxide) and IZO (indium Zinc Oxide).

4. The device of claim 1, further comprising:
a passivation film formed on an entire surface of the first substrate and covering the data line.

5. The device of claim 4, wherein the black matrix and the color filer are formed above the passivation film.

6. The device of claim 1, wherein the common electrode and the pixel electrode are in contact with the planarization film.

7. The device of claim 1, wherein the common electrode and the pixel electrode are coplanar.

8. The device of claim 1, wherein the common electrode and the pixel electrode are above the black matrix.

9. The device of claim 1, wherein the black matrix is below the common line.

10. The device of claim 9, wherein the black matrix is wider than the common line.

11. The device of claim 1, wherein the distance between the first portion of the common line and the pixel electrode is about 7 μm~9 μm.

12. The device of claim 1, wherein the black matrix extends into the pixel region to between the first portion of the common line and the pixel electrode.

13. The device of claim 1, further comprising:
a data signal cutoff line located in the pixel region and between the data line and the pixel electrode, the data signal cutoff line being parallel to the data line.

14. The device of claim 13, wherein the black matrix along the data line overlaps with a portion of the data signal cutoff line.

15. The device of claim 13, wherein the data signal cutoff line is in contact with the substrate.

16. The device of claim 13, wherein the data signal cutoff line is electrically connected with the common electrode.

17. The device of claim 1, wherein the liquid crystal display device is an in-plane switching mode liquid crystal display device, and the electric field is an in-plane electric field.

18. The device of claim 1, wherein the common electrode and the pixel electrode are made of a transparent conductive material, and
wherein the transparent conductive material is one of ITO (Indium Tin Oxide) and IZO (indium Zinc Oxide).

* * * * *

UNITED STATES PATENT AND TRADEMARK OFFICE
CERTIFICATE OF CORRECTION

| | | |
|---|---|---|
| PATENT NO. | : 7,663,723 B2 | Page 1 of 1 |
| APPLICATION NO. | : 11/374108 | |
| DATED | : February 16, 2010 | |
| INVENTOR(S) | : Dong-Guk Kim | |

It is certified that error appears in the above-identified patent and that said Letters Patent is hereby corrected as shown below:

ON THE TITLE PAGE:

At Item (75) Inventor, correct the identification of the Inventor as follows:

Change

"Dung-Guk Kim, Gyeonggi-Do (KR)"

to

--Dong-Guk Kim, Gyeonggi-Do (KR)--.

Signed and Sealed this

Sixteenth Day of November, 2010

David J. Kappos
*Director of the United States Patent and Trademark Office*